(12) United States Patent
Huang et al.

(10) Patent No.: US 11,163,344 B2
(45) Date of Patent: Nov. 2, 2021

(54) LAPTOP WITH ACTIVE DOOR

(71) Applicant: Acer Incorporated, New Taipei (TW)

(72) Inventors: Yi-Ta Huang, New Taipei (TW);
Wu-Chen Lee, New Taipei (TW);
Cheng-Nan Ling, New Taipei (TW);
Wen-Chieh Tai, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/069,814

(22) Filed: Oct. 13, 2020

(65) Prior Publication Data
US 2021/0286416 A1 Sep. 16, 2021

(30) Foreign Application Priority Data
Mar. 10, 2020 (TW) .................. 109202672

(51) Int. Cl.
*G06F 1/20* (2006.01)
*G06F 1/16* (2006.01)

(52) U.S. Cl.
CPC ............ *G06F 1/203* (2013.01); *G06F 1/1681* (2013.01)

(58) Field of Classification Search
CPC ...... G06F 1/1616; G06F 1/203; G06F 1/1681; G06F 1/166; G06F 1/1656; G06F 1/1624; G06F 1/1637; G06F 1/1667; G06F 1/1683; G06F 1/1684; G06F 1/206; G06F 1/1626; G06F 1/1647; G06F 1/1662; G06F 1/1675; G06F 1/1679; G06F 1/183; G06F 1/26; G06F 1/3203; G06F 1/324
See application file for complete search history.

(56) References Cited

U.S. PATENT DOCUMENTS

| | | | | |
|---|---|---|---|---|
| 5,552,960 A * | 9/1996 | Nelson | ..................... | G06F 1/203 165/104.33 |
| 5,918,957 A * | 7/1999 | Bovio | ................... | G06F 1/1656 312/223.2 |
| 6,612,668 B2 * | 9/2003 | Doan | ..................... | G06F 1/1616 16/303 |
| 6,744,629 B2 * | 6/2004 | Hidesawa | ............... | G06F 1/206 361/679.48 |
| 8,014,147 B2 * | 9/2011 | Chen | ....................... | G06F 1/183 361/679.56 |
| 8,542,486 B2 * | 9/2013 | Lin | ......................... | G06F 1/203 361/693 |
| 9,213,374 B2 * | 12/2015 | Hung | .................... | G06F 1/1681 |

(Continued)

FOREIGN PATENT DOCUMENTS

| | | |
|---|---|---|
| TW | I528139 | 4/2016 |
| TW | I547234 | 8/2016 |
| TW | M572622 | 1/2019 |

*Primary Examiner* — Abhishek M Rathod
(74) *Attorney, Agent, or Firm* — JCIPRNET (57) ABSTRACT

A laptop with active door including a first body, a second body, a hinge connected between the first body and the second body, a linking assembly pivoted to the hinge and slidably disposed on the first body, a door movably disposed on the first body, a first linking rod, and a second linking rod is provided. The first linking rod has a first end and a second end opposite to each other, the first end is pivoted to the linking assembly, and the second end is pivoted the door. The second linking rod has a third end and a fourth end opposite to each other, the third end is pivoted to the first body, and the fourth end is pivoted to the first linking rod.

10 Claims, 9 Drawing Sheets

(56) References Cited

U.S. PATENT DOCUMENTS

| | | | | |
|---|---|---|---|---|
| 9,317,064 B2* | 4/2016 | Wu | ............ | G06F 1/203 |
| 10,120,412 B2* | 11/2018 | Chen | ............ | G06F 1/1637 |
| 10,289,176 B1* | 5/2019 | Chen | ............ | G06F 1/1656 |
| 10,642,309 B2* | 5/2020 | Cheng | ............ | G06F 1/1616 |
| 10,678,312 B2* | 6/2020 | Hsu | ............ | G06F 1/1616 |
| 11,054,872 B2* | 7/2021 | Wu | ............ | G06F 1/1616 |
| 2011/0075352 A1* | 3/2011 | Tye | ............ | G06F 1/203 |
| | | | | 361/679.46 |
| 2011/0261519 A1* | 10/2011 | Chiu | ............ | G06F 1/1616 |
| | | | | 361/679.02 |
| 2011/0273832 A1* | 11/2011 | Tracy | ............ | G06F 1/1656 |
| | | | | 361/679.31 |
| 2013/0107465 A1* | 5/2013 | Huang | ............ | G06F 1/166 |
| | | | | 361/725 |
| 2013/0225001 A1* | 8/2013 | Chang | ............ | G06F 1/166 |
| | | | | 439/625 |
| 2013/0308268 A1* | 11/2013 | Tani | ............ | G06F 1/1679 |
| | | | | 361/679.57 |
| 2015/0016057 A1* | 1/2015 | Fu | ............ | G06F 1/203 |
| | | | | 361/679.55 |
| 2015/0227168 A1* | 8/2015 | Nakamura | ............ | G06F 1/1681 |
| | | | | 361/679.55 |
| 2017/0153677 A1* | 6/2017 | Cheng | ............ | G06F 1/1616 |
| 2019/0250674 A1* | 8/2019 | Lin | ............ | F16M 13/005 |
| 2019/0278345 A1* | 9/2019 | Ye | ............ | F24F 13/15 |
| 2021/0089077 A1* | 3/2021 | Wang | ............ | G06F 1/1656 |

* cited by examiner

LAPTOP WITH ACTIVE DOOR

CROSS-REFERENCE TO RELATED APPLICATION

This application claims the priority benefit of Taiwan application serial no. 109202672, filed on Mar. 10, 2020. The entirety of the above-mentioned patent application is hereby incorporated by reference herein and made a part of this specification.

BACKGROUND

Field of the Disclosure

This disclosure is related to a laptop, and especially related a laptop with an active door.

Description of Related Art

In recent years, with the development of the technology industry, electronic devices such as a laptop, personal digital assistants and smart phones have frequently used in daily life. Some electronic components inside these electronic devices usually generate thermal energy during operation, which affects the operating performance of electronic devices. Therefore, a heat dissipation module or a heat dissipation component is usually arranged inside the housing of the electronic device, for example, a cooling fan, a cooling paste or a cooling tube to help dissipate the heat generated by the electronic component to the outside of the electronic device.

Most existing laptops use heat sinks, such as fans, to dissipate the heat inside the housing by using the openings on the housing. However, with the enhancement of the function of laptops, the heating power of the electronic components such as the processor and the display chip will also increase accordingly, so which is still likely to cause most of the heat to accumulate in the housing and be dissipated by the cooling fan. In this state, even if more openings are formed on the housing to help dissipate heat, it is easy for foreign objects, such as dust, to enter the housing. Moreover, the cooling device is not always in a state of having to dissipate a large amount of heat.

According to this, how to optimize the heat dissipation device in the laptop with an efficient structural configuration so that the heat dissipation device has better heat dissipation efficiency is an issue to be dealt with by practitioners of the field.

SUMMARY OF THE DISCLOSURE

The disclosure provides a laptop with an active door, which can open or close the corresponding heat dissipation channel as the laptop is opened or closed.

In the disclosure, the laptop with an active door includes a first body, a second body, a hinge, a linking assembly, a door, a first linking rod, and a second linking rod. The hinge is connected between the first body and the second body. The linking assembly is pivoted to the hinge and slidably disposed on the first body. The door is movably disposed on the first body. The first linking rod has a first end and a second end opposite to each other, the first end is pivoted to the linking assembly, and the second end is pivoted to the door. The second linking rod has a third end and a fourth end opposite to each other, the third end is pivoted to the first body, and the fourth end is pivoted to the first linking rod. When the first body and the second body are rotated and opened or closed relative to each other through the hinge, the second body drives the door to move away from or toward the first body through the hinge, the linking assembly, the first linking rod and the second linking rod sequentially, thereby opening or closing the opening of the first body.

Based on the above, with the cooperation between related components, when the first body and the second body are rotated and opened or closed relative to each other through the hinge, the second body drives the door to move away from or toward the first body through the hinge, the linking assembly, the first linking rod and the second linking rod sequentially, thereby opening or closing the opening of the first body. In the opening state, the above component drives the door to move away from the bottom of the first body and opens the opening of the first body, so that the internal environment of the first body communicates with the external environment through the opening, thereby expediting to dissipate the heat accumulated in the first body.

Conversely, when the first body and the second body are in a relative closed state, it means that the laptop is not in an operating state at this time, that is, there is not a large amount of heat generated in the first body. Therefore, the door is driven to be closed on the first body to close the opening, so that foreign objects, such as dust, can be prevented from entering the first body through the opening.

As can be seen from the above, the active door provided at the bottom of the first body can be opened or closed according to the state of the laptop, which helps to provide a cooling path when there is a need for heat dissipation, and the opening is closed when there is no need to dissipate heat, thus providing the laptop with a better structural configuration with a better heat dissipating function.

DESCRIPTION OF EMBODIMENTS

Figure 1A:
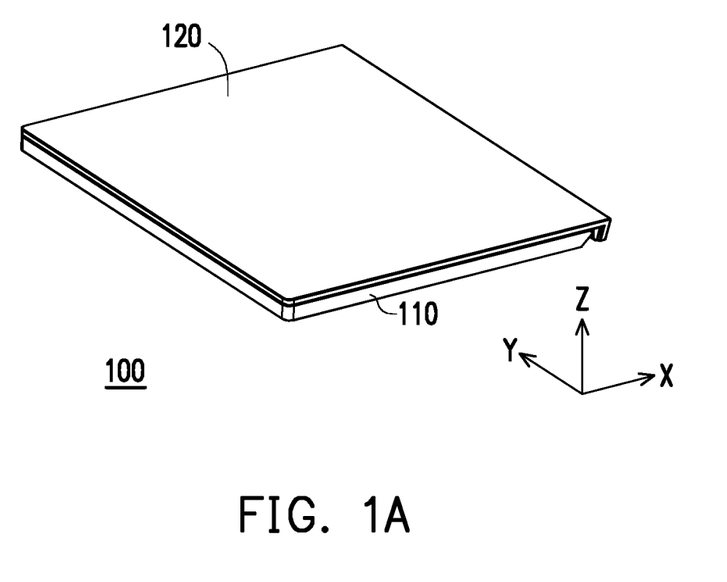
FIG. 1A is a schematic view of a laptop according to an embodiment of the disclosure.
Figure 1B:
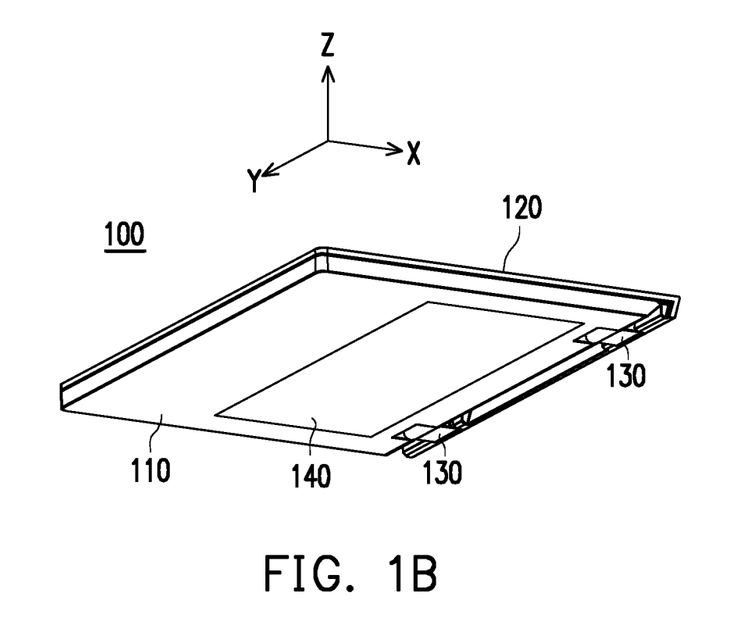
FIG. 1B illustrates the laptop of FIG. 1A from another viewing angle.
Figure 1C:
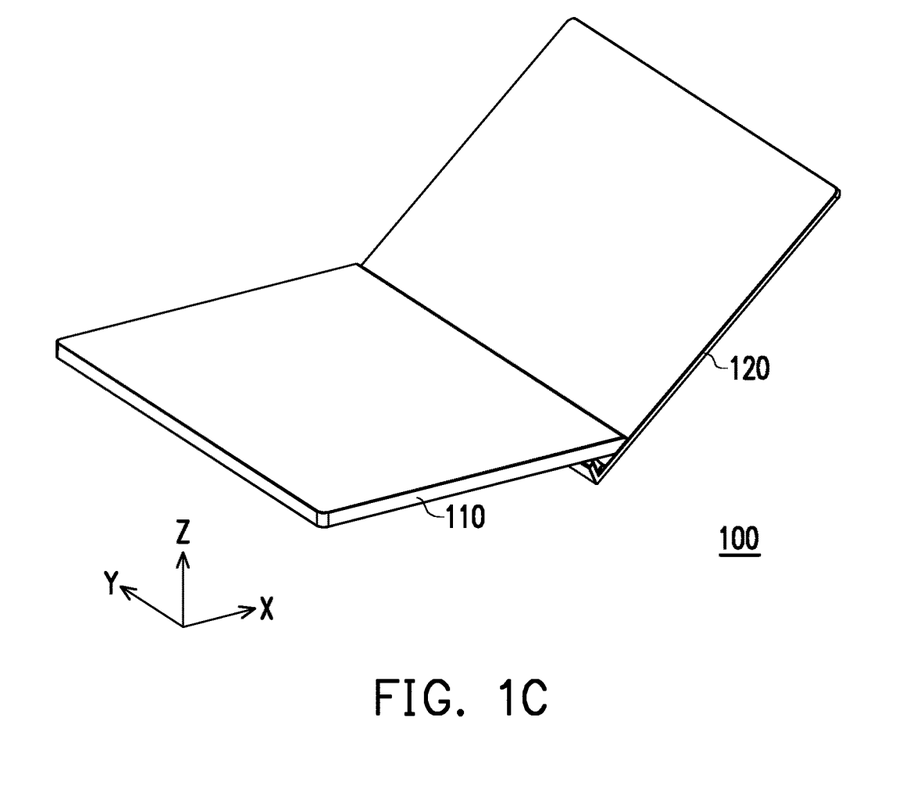
FIG. 1C and FIG. 1D respectively illustrate an opening state of the laptop from different viewing angles.
Figure 1D:
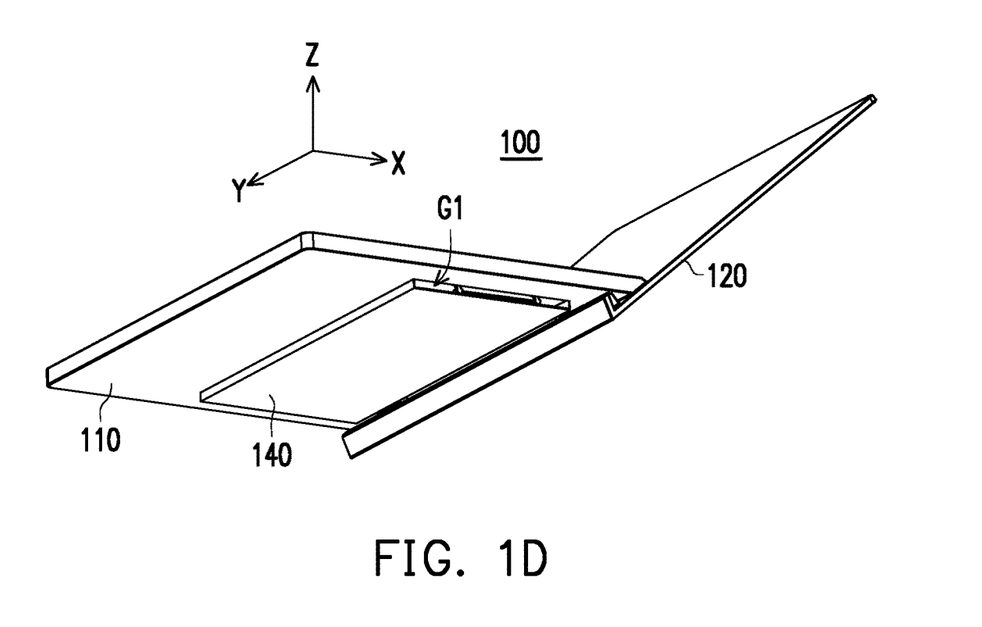

FIG. 1A is a schematic view of a laptop according to an embodiment of the disclosure. FIG. 1B illustrates the laptop of FIG. 1A from another viewing angle. FIG. 1C and FIG. 1D respectively illustrate an opening state of the laptop from different viewing angles. In the meantime, a Cartesian coordinate X-Y-Z is provided in the figure to facilitate describing the components. Please refer to FIG. 1A, FIG. 1B, and FIG. 1C. In this embodiment, the laptop 100 includes a first body 110, a second body 120, a hinge 130, and a door 140. The hinge 130 is connected to the first body 110 and the second body 120, so that the first body 110 and the second body 120 can pivot to each other to be opened or closed through the hinge 130. The door 140 is movably arranged at the bottom of the first body 110. With the cooperation of related components, when the laptop 100 is opened or closed as shown in FIG. 1B and FIG. 1D (FIG. 1A and FIG. 1B are defined as a closed state, FIG. 1C and FIG. 1D are defined as the opening state), the door 140 can be moved away from or toward the bottom of the first body 110, thereby achieving the effect of opening or closing the opening G1. As shown in FIG. 1D, after the laptop 100 forms an opening G1 at the bottom of the first body 110, the internal environment inside the first body 110 and the external environment can communicate with each other through the opening G1, that is, an additional dissipation outlet is provided for the heat in the first body 110. If the opening G1 is further provided with the outlet of a cooling device (such as a fan), the heat in the first body 110 can be smoothly and quickly dissipated out of the first body 110 through the opening G1.

Figure 2A:
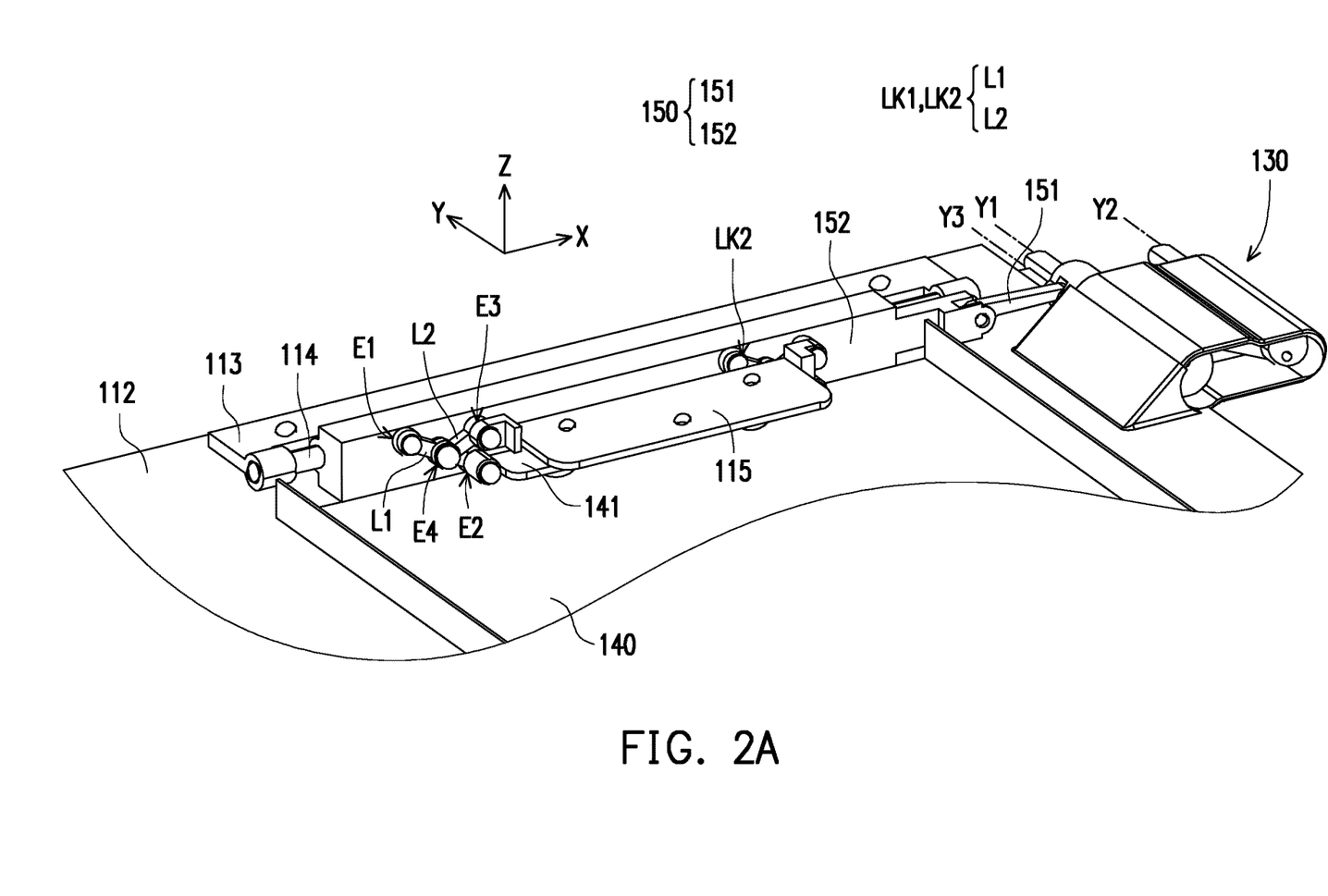
FIG. 2A is a schematic view showing some components of the laptop of FIG. 1A.
Figure 2B:
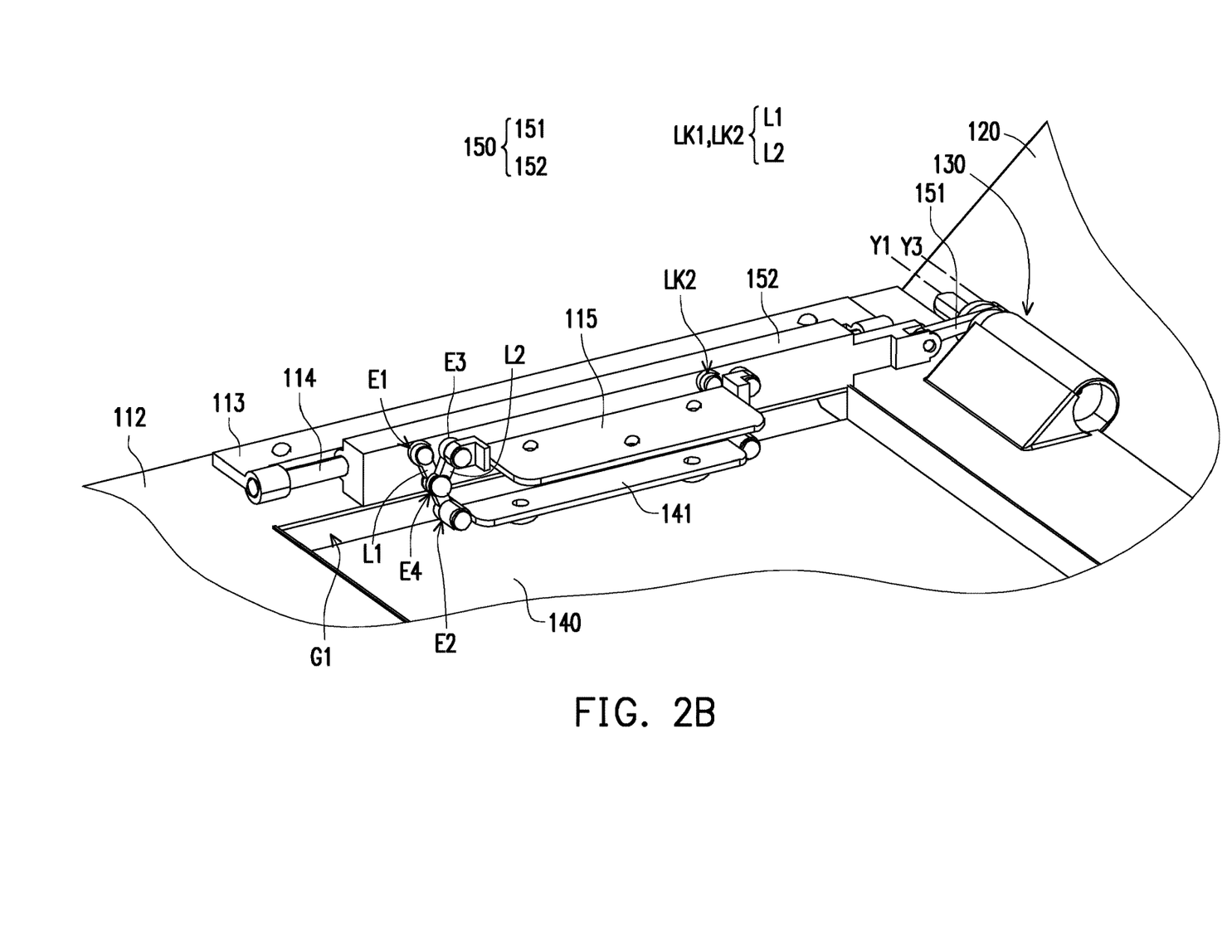
FIG. 2B is a schematic view showing some components of the laptop of FIG. 1C.
Figure 2C:
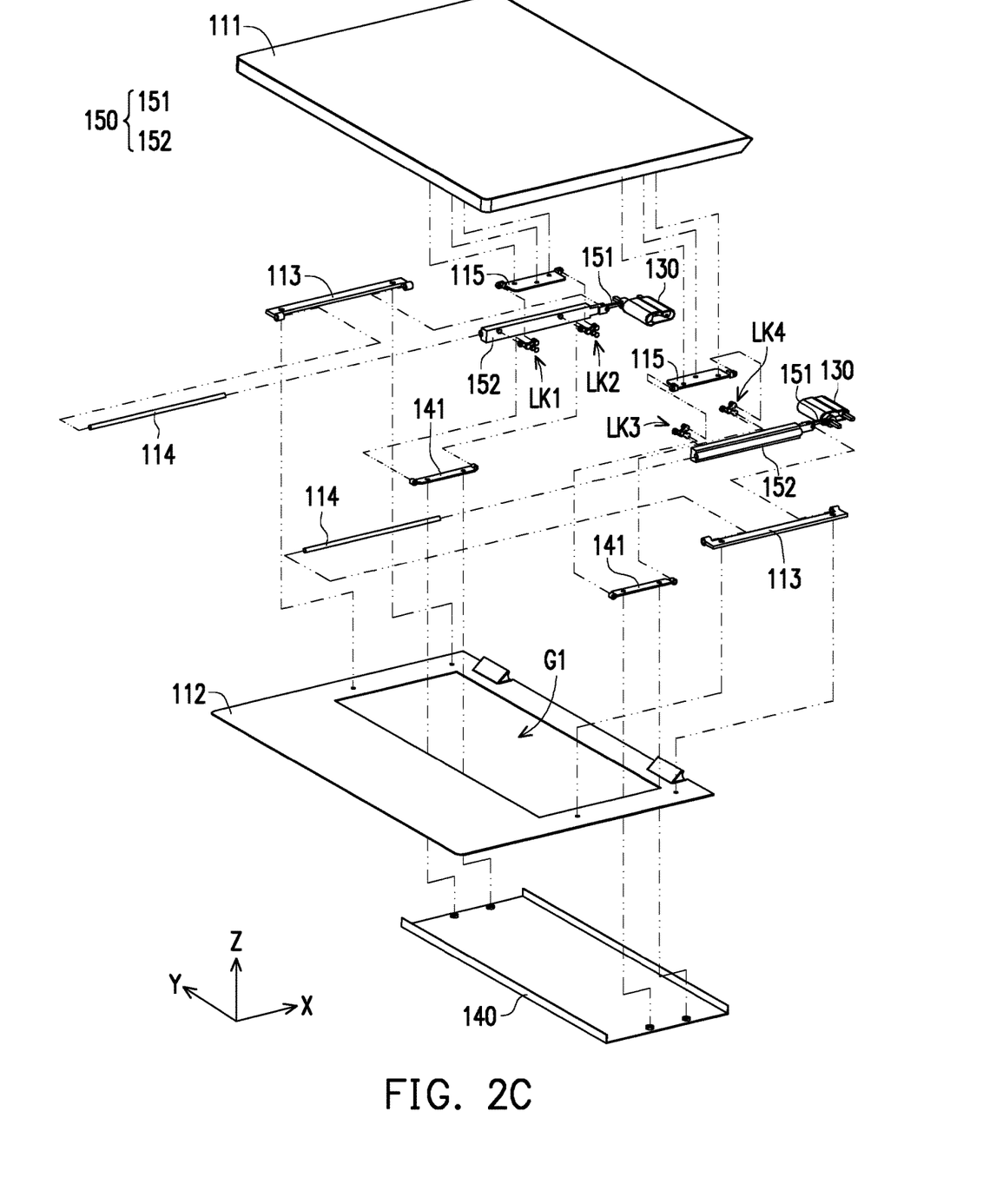
FIG. 2C is an exploded view of some components of the laptop of FIG. 1A.
Figure 2D:
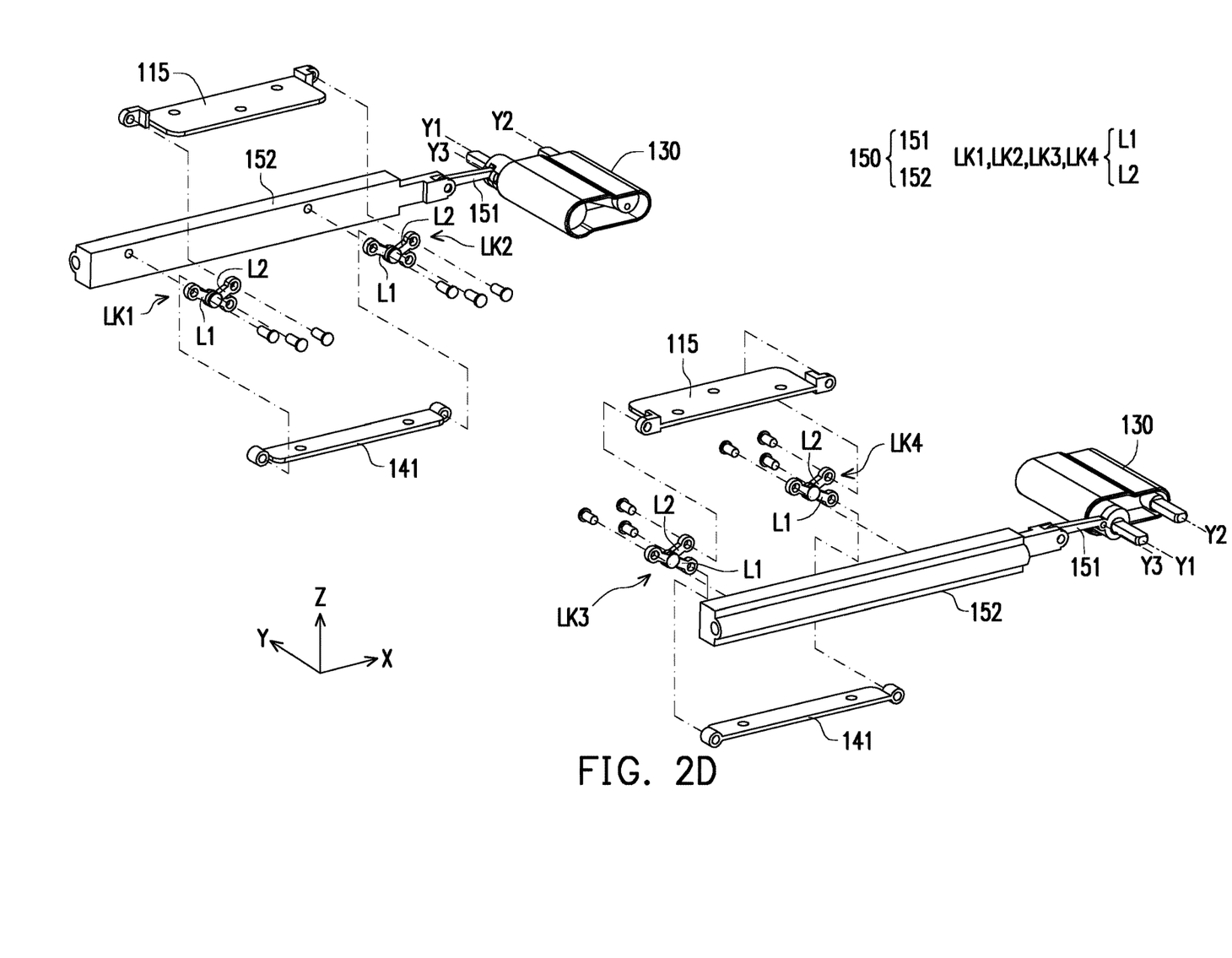
FIG. 2D is a partially enlarged view of FIG. 2C.

FIG. 2A is a schematic view showing some components of the laptop of FIG. 1A. FIG. 2B is a schematic view showing some components of the laptop of FIG. 1C. FIG. 2C is an exploded view of some components of the laptop of FIG. 1A. FIG. 2D is a partially enlarged view of FIG. 2C. Please refer to FIG. 2A, FIG. 2C, and FIG. 2D. In detail, the laptop 100 further includes a linking assembly 150 and a linking rod set LK1 to LK4. It should be mentioned first that each of the linking rod sets LK1 to LK4 has the same configuration structure, so one of the linking rod sets LK1 to LK4 will be described as an example in the following description.

In this embodiment, the linking assembly 150 is pivoted to the hinge 130 and slidably disposed on the first body 110, and the linking rod set LK1 includes a first linking rod L1 and a second linking rod L2, wherein the first linking rod L1 has a first end E1 and a second end E2 opposite to each other, and the second linking rod L2 has a third end E3 and a fourth end E4 opposite to each other. As shown in FIG. 2D, with a plurality of pivoting components, the first end E1 is pivoted to the linking assembly 150, the second end E2 is pivoted to the door 140, the third end E3 is pivoted to the first body 110, and the fourth end E4 is pivoted to the first linking rod L1.

As shown in FIG. 2C and FIG. 2D, further, the first body 110 includes a component 111, a component 112, a bracket 113 provided on the component 112, and a guiding rod 114 provided on the bracket 113. The linking assembly 150 includes a third linking rod 151 and a slider 152, the third linking rod 151 is pivoted to the hinge 130, and the component 111 and the component 112 are combined to form a main structure of the first body 110 and a space therein. The component 112 has the opening G1, the door 140 is movably disposed on the component 112 to open or close the opening G1, and the door 140 has brackets 141 on opposite sides. In addition, the first body 110 further includes a bracket 115 provided on the component 111.

In detail, the position where the third linking rod 151 of the linking assembly 150 and the hinge 130 are pivoted together is eccentric to the rotation axis of the hinge 130, as shown in FIG. 2C and FIG. 2D. The hinge 130 is a biaxial hinge having rotation axes Y1 and Y2 (parallel to the axis Y), and the third linking rod 151 is pivoted to the hinge 130 along the pivot axis Y3, and the pivot axis Y3 is parallel and different from the rotation axes Y1 and Y2. The guiding rod 114 is provided on the bracket 113 along the axis X, and the slider 152 is movably coupled to the guiding rod 114, thereby establishing that the slider 152 on the guiding rod 114 slides back and forth along the axis X, and the slider 152 pivots to the third linking rod 151, and its pivot axis is parallel to the axis Y.

Next, the corresponding relationship between the linking rod set LK1 and each component is further described. In this embodiment, the first end E1 is pivoted to the slider 152 of the linking assembly 150, the second end E2 is pivoted to the bracket 141 of the door 140, the third end E3 is pivoted to the bracket 115 of the first body 110, and the fourth end E4 is pivoted to the first linking rod L1. Furthermore, the fourth end E4 is located between the first end E1 and the second end E2, such that the position where the fourth end E4 and the first linking rod L1 are pivoted together further forms the rotation center of the first linking rod L1. Because the slider 152 is pivoted to the third linking rod 151, the slider 152 is driven to slide along the guiding rod 114 by the third linking rod 151 while the hinge 130 is rotated, wherein the rotation direction of the first linking rod L1 is opposite to the rotation direction of the second linking rod L2.

Figure 3A:
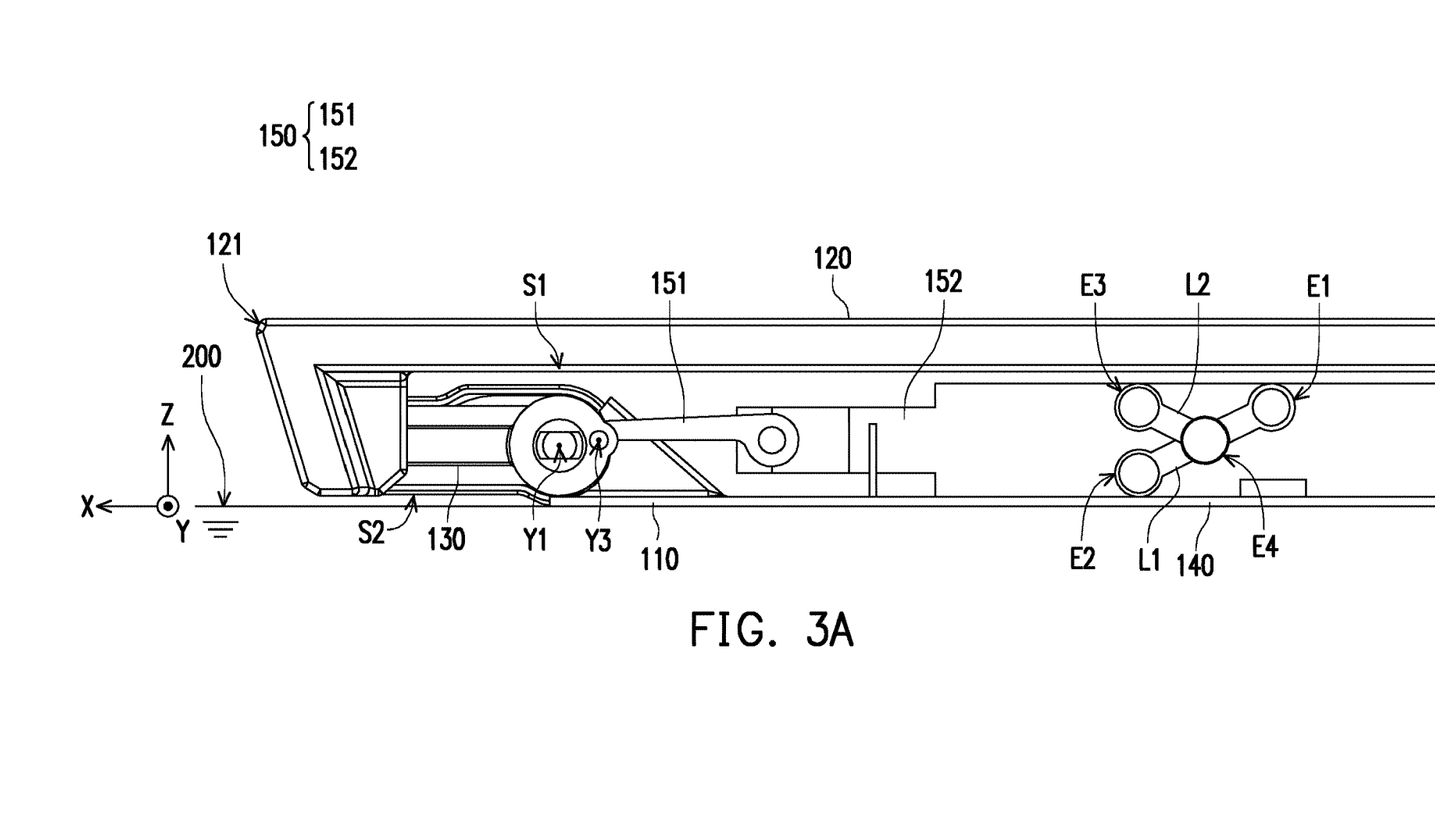
FIG. 3A to FIG. 3C are partial side views of the laptop in different states.
Figure 3B:
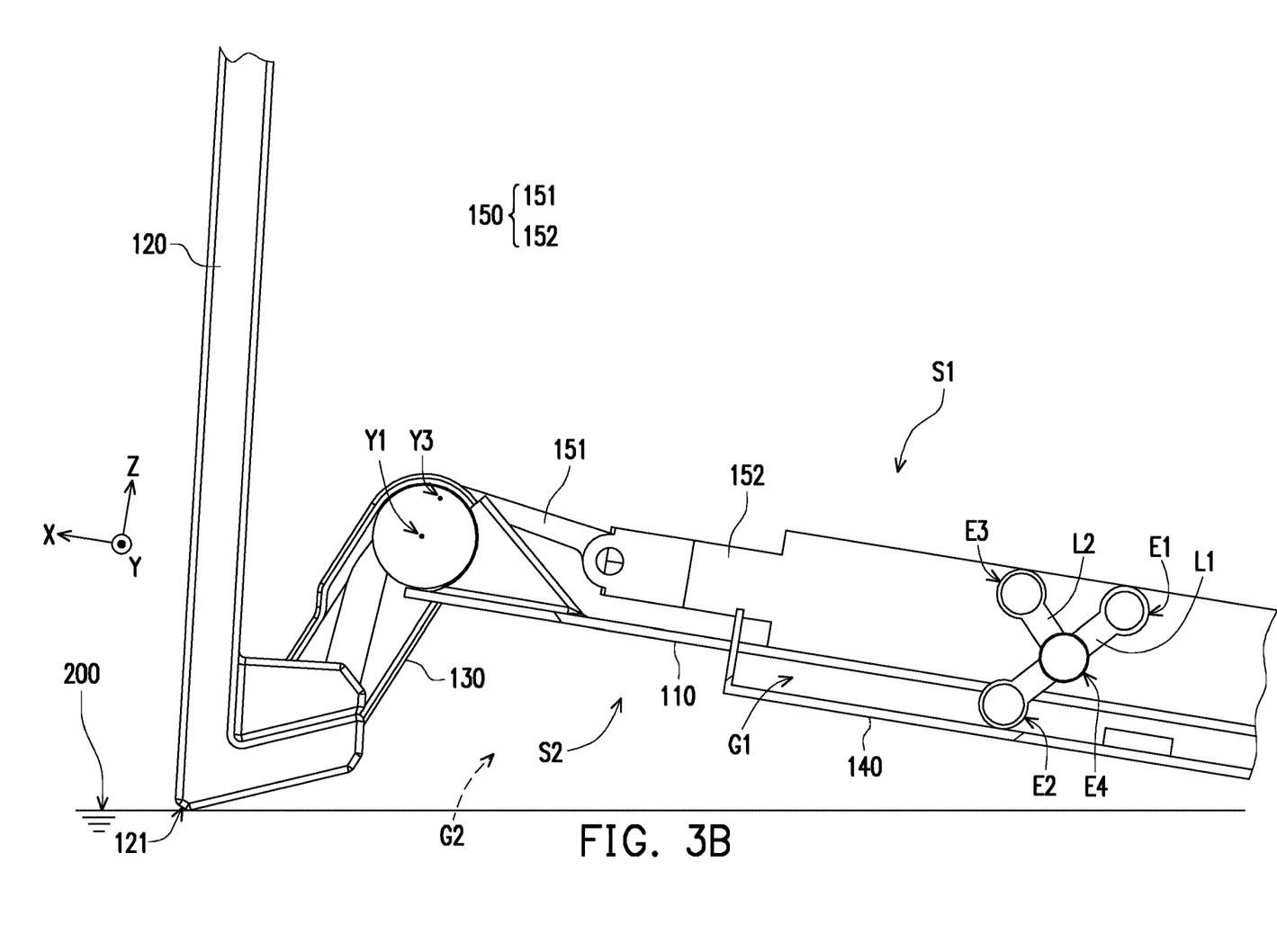
Figure 3C:
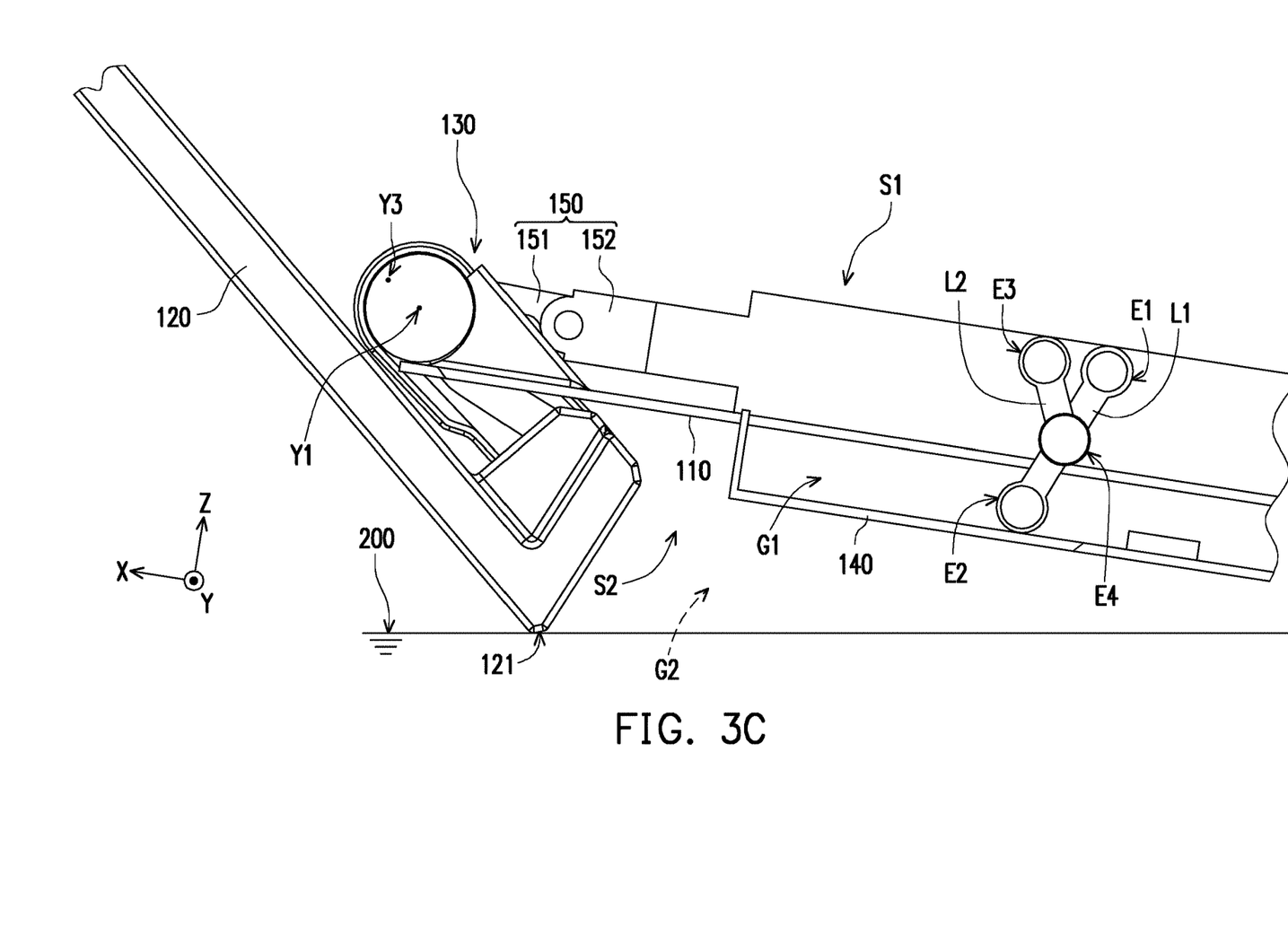

FIG. 3A to FIG. 3C are partial side views of the laptop in different states, which facilitate to identify the opening and closing relationship of the laptop 100 with respect to the opening and closing of the door 140, and some components are omitted to show a simple illustration. It should be mentioned that the provided Cartesian coordinate X-Y-Z are based on the bottom plane of the first body 110, so it will be held up and rotate in the opening process of the first body 110. Please refer to FIG. 3A to FIG. 3C. In this embodiment, the first end E1 and the third end E3 are located on the same plane. In the state shown in FIG. 3A, the laptop 100 is placed on the plane 200 (e.g., a platform or a table top), so the plane where the first end E1 and the third end E3 are located is parallel to the X-Y plane and also parallel to the bottom of the first body 110. Furthermore, since the above-mentioned four linking rod sets LK1 to LK4 are also located on the same plane, the door 140 moves in a manner of being parallel to the plane to move toward or away from the bottom of the first body 110. It should be noted that, in FIGS. 3B and 3C, since the side edge 121 of the second body 120 is transferred from the first side S1 of the first body 110 to the second side S2 during the opening process, and then abuts to the plane 200 to push up a part of the first body 110 close to the hinge 130, thereby forming a space G2 between the bottom of the first body 110 and the plane 200, thus allowing the door 140 to move away from the first body 110, that is, to make the relative distance between the door 140 relative to the bottom of the first body 110 be smaller than the height of the space G2, and on this occasion, the moving method of the door 140 is regarded as a translating movement that is performed parallel to the bottom of the first body 110.

During the opening process (from FIG. 3A to FIG. 3C), the second body 120 is rotated and opened relative to the first body 110 through the hinge 130, and the hinge 130 rotates to drive the linking assembly 150 to move toward the second body 120, and the first end E1 of the linking rod sets LK1 to LK4 moves toward the third end E3, and the second end E2 moves away from the third end E3, and then pushes the door 140 away from the bottom of the first body 110 to open the opening G1. Conversely, during the closing process (from FIG. 3C to FIG. 3A), the second body 120 is rotated and closed relative to the first body 110 through the hinge 130, and the hinge 130 is rotated to drive the linking assembly 150 to move away from the second body 120, the first end E1 of the linking rod sets LK1 to LK4 moves away from the third end E3, the second end E2 moves toward the third end E3, and the door 140 moves toward the bottom of the first body 110 to close the opening G1. The side edge 121 of the aforementioned second body 120 moves from the second side S2 to the first side S1. Accordingly, in the laptop 100 of this embodiment, when the first body 110 and the second body 120 are relatively rotated and opened or closed through the hinge 130, the second body 120 drives the door 140 to move away from the first body 110 or toward the first body 110 through the hinge 130, the linking assembly 150, the first linking rod L1 and the second linking rod L2 of the linking rod sets LK1 to LK4 in sequence to open or close the opening G1 of the first body 110.

In summary, in the above embodiment of the disclosure, with the cooperation between related components, when the first body and the second body are rotated and opened or closed relative to each other through the hinge, the second body drives the door to move away from or toward the first body through the hinge, the linking assembly, the first linking rod and the second linking rod sequentially, thereby opening or closing the opening of the first body. In the opening state, the above component drives the door to move away from the bottom of the first body and opens the opening of the first body, so that the internal environment of the first body communicates with the external environment through the opening, thereby expediting to dissipate the heat accumulated in the first body.

Conversely, when the first body and the second body are in a relative closed state, it means that the laptop is not in an operating state at this time, that is, there is not a large amount of heat generated in the first body. Therefore, the door is driven to be closed on the first body to close the opening, so that foreign objects, such as dust, can be prevented from entering the first body through the opening.

As can be seen from the above, the active door provided at the bottom of the first body can be opened or closed according to the state of the laptop, which helps to provide a cooling path when there is a need for heat dissipation, and the opening is closed when there is no need to dissipate heat, thus providing the laptop with a better structural configuration with a better heat dissipating function.

What is claimed is:

1. A laptop with a door, comprising:
   a first body;
   a second body;
   a hinge connected between the first body and the second body;
   a linking assembly pivoted to the hinge and slidably disposed on the first body;
   the door movably arranged on the first body;
   a first linking rod having a first end and a second end opposite to each other, the first end being pivoted to the linking assembly, and the second end being pivoted to the door; and
   a second linking rod having a third end and a fourth end opposite to each other, the third end being pivoted to the first body, and the fourth end being pivoted to the first linking rod,
   wherein the first body and the second body are relatively rotated and opened or closed through the hinge, the second body drives the door to move away from the first body or toward the first body through the hinge, the linking component, the first linking rod, and the second linking rod in sequence to open or close an opening of the first body.

2. The laptop with the door of claim 1, wherein a position where the linking assembly and the hinge are pivoted together is eccentric to a rotation axis of the hinge.

3. The laptop with the door of claim 1, wherein a rotation direction of the first linking rod is opposite to a rotation direction of the second linking rod.

4. The laptop with the door of claim 1, wherein a position where the fourth end and the first linking rod are pivoted together forms a rotation center of the first linking rod, and the fourth end is located between the first end and the second end.

5. The laptop with the door of claim 1, wherein the first end is located on the same plane as the third end, and the door is moved parallel to the plane to move toward or away from the bottom of the first body.

6. The laptop with the door of claim 1, wherein during an opening process, the second body is rotated and opened relative to the first body through the hinge, and the hinge rotates to drive the linking assembly to move toward the second body, the first end moves toward the third end, the second end moves away from the third end, and the door moves away from the bottom of the first body to open the opening.

7. The laptop with the door of claim 1, wherein in a closing process, the second body is rotated and closed relative to the first body through the hinge, and the hinge is rotated to drive the linking assembly to move away from the second body, the first end moves away from the third end, the second end moves towards the third end, and the door moves toward the bottom of the first body to close the opening.

8. The laptop with the door of claim 1, wherein the second body has a guiding rod, and the linking assembly comprises:
   a third linking rod pivoted to the hinge and eccentric to a rotation axis of the hinge; and
   a slider slidably coupled to the guiding rod, wherein the slider is pivoted to the third linking rod, and the hinge rotates to drive the slider to slide along the guiding rod through the third linking rod.

9. The laptop with the door of claim 1, wherein in an opening process, the second body is rotated and opened relative to the first body, and a side edge of the second body is moved from a first side of the first body to a second side of the first body, the door is located on the second side, the hinge is rotated and drives the linking assembly to move toward the second body, and the first end moves toward the third end, and in a closing process, the second body is rotated and closed relative to the first body, and the side edge is moved from the second side back to the first side.

10. The laptop with the door of claim 9, wherein when the laptop is placed on a plane and undergoes the opening process, the side edge abuts the plane such that a space is formed between the first body and the plane, the door moves away from the bottom of the first body to be located in the space, and a relative distance between the door relative to the bottom of the first body is smaller than the height of the space.

* * * * *